Sept. 20, 1927.  A. WICHERT  1,642,707
HANGER CLAMP FOR STRANDED CABLES
Filed Jan. 27, 1927
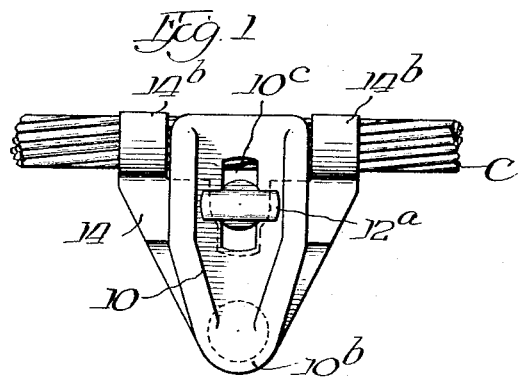
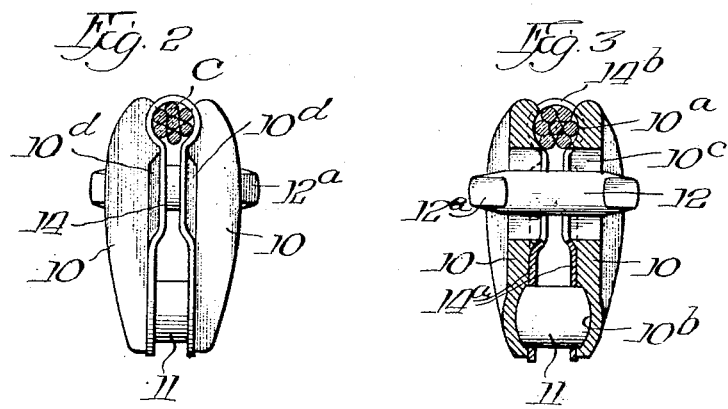
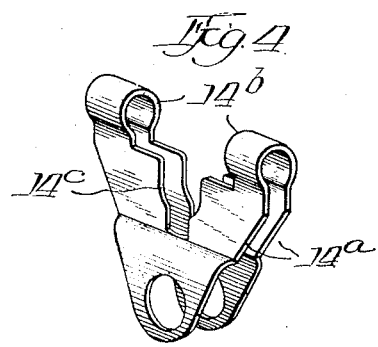

Patented Sept. 20, 1927.

1,642,707

UNITED STATES PATENT OFFICE.

ALFRED WICHERT, OF MANNHEIM-NEUOSTHEIM, GERMANY, ASSIGNOR TO AKTIEN-GESELLSCHAFT BROWN, BOVERI & CIE., OF BADEN, SWITZERLAND, A JOINT-STOCK COMPANY.

HANGER CLAMP FOR STRANDED CABLES.

Application filed January 27, 1927, Serial No. 164,058, and in Germany February 3, 1926.

This invention relates generally to cable hangers, and pertains particularly to hanger clamps designed for the suspension of the contact trolley wire for electrical railway systems from a catenary cable which is made up of a plurality of component strands.

The general object of the invention is the provision of a form of clamp or connecting device which is qualified for use at either the upper or lower end of the hanger wire, that is, for connecting the hanger wire to either the contact wire or to the catenary cable, and which, when used for the latter connection, will effectively prevent the working out of the component strands of the cable from the jaws of the clamp.

Another object is the provision of such a device which is of simple and strong construction, which will form a very secure connection between the hanger wire and the suspension cable, which is easily installed and may be detached with equal facility when desired, and which is not adversely affected with respect to the last mentioned characteristic by rusting or dust deposit.

Other and further objects and advantages will be pointed out or indicated hereinafter, or will appear to one skilled in the art upon an understanding of the invention or its employment in practice.

In the accompanying drawing forming a part of this specification I show, for purpose of exemplification, one embodiment of the invention, but it is to be understood that the invention as defined in the appended claims is not limited to this particular construction or to the details thereof.

In said drawing Fig. 1 is a side elevational view of the clamp showing it as applied to a stranded suspension cable, Fig. 2 is an end elevation, Fig. 3 is a longitudinal section on approximately line 3—3 of Fig. 1 and Fig. 4 is a perspective view of the cable constricting member.

The nature of the invention will be most quickly ascertained by reference to the illustrative embodiment shown. In this construction the clamp is formed of a pair of duplicate jaw members 10 having their inner surfaces adjacent one end shaped to provide concave seat portions 10$^a$ for reception of the line, which may be either the contact wire or the catenary cable. Adjacent their opposite ends the clamp members 10 are formed on their inner faces with the concave seat 10$^b$ for reception of the spherical surfaced ends of the stud 11. They are also provided with a slot 10$^c$ for reception of a wedging key member 12 which has overhanging head portions 12$^a$ that are insertable through said slot and then rotatable to exercise a camming or wedging action upon the jaw members tending to force them together into clamping engagement with a line positioned in the seat portions 10$^a$. The stud 11 forms a means of attachment for the hanger wire, which is looped about the same between the jaw members 10. A clamp of the construction just described is suitable for use either at the upper or lower end of the hanger wire as a means for connecting it either to the contact wire or the catenary suspension line. There are certain advantages in the use of a uniform type of clamp at both ends of the hanger wire. However, with certain type of suspension cables which are made up of a plurality of strands, there is a possibility of the relatively movable strands being displaced by the clamping pressure of the jaws 10, and individual strands working out of their mutually supporting relationship in such fashion that the cable as a whole does not afford a proper resistance to the clamping pressure of the jaws, with the result that the clamp becomes loose and possibly detached from the cable. In order to prevent this, there is provided a cable constricting member 14, which is assembled with the clamp when it is to be attached to a stranded cable of the sort mentioned. This is a resilient metal plate of proper strength which is folded over to form a pair of relatively parallel wing portions 14$^a$ connected by sleeve portions 14$^b$. The latter are spaced apart at proper distance to receive the jaw portions 10 between them. The wing portions are notched at 14$^c$ to accommodate the passage of the wedge key 12, and they are provided near their lower ends with the apertures 14$^d$ for accommodation of the stud 11, said apertures being of a size to make a contacting fit with the stud.

When the clamp is to be applied to a cable, as indicated at C, the cable constricting member 14 is first sprung over the cable so as to confine the latter within the sleeve portions 14$^b$. The jaw members 10 are then applied, the stud 11 being inserted through the apertures 14ᵈ and the seat portions 10ᵃ being applied to the cable between the sleeve members 14ᵇ. The wedge key 12 is then inserted and turned to the securing position. This operation not only clamps the cable between the jaw members but also draws the constricting member 14 into close binding engagement with the cable, which is effective to hold the strands against spreading apart under the clamping pressure of the jaws. The constricting envelopment of the cable by the constricting member is aided by inwardly projecting embossments 10ᵈ on the inner sides of the jaw members, which embossments engage the outer faces of the wing portions 14ᵃ. The member 14 finds anchorage on the lower ends of the embossments 10ᵈ against the vertical pull, and is held against longitudinal displacement from the clamp by its engagement with the stud 11 and the wedge key 12. Thus the sleeve portions 14ᵇ and the cable clamping seat of the jaw members are maintained in proper longitudinal alignment.

What I claim is:

1. In a line supporting device, the combination of jaw members, means for securing them in clamping engagement with a line, and a constricting member secured between the jaw members and having a sleeve portion for embracing the line.

2. A cable clamp comprising relatively movable jaw members, means for securing them in clamping engagement with a cable, and a constricting member having a sleeve portion for embracing the cable adjacent the jaw members and portions engageable by the jaw members to constrict the sleeve portion.

3. A cable clamp comprising jaw members, a securing member for holding said jaw members in clamping engagement with a cable, a constricting member having a sleeve portion for embracing the cable adjacent the jaw members and wing portions clamped between the jaw members to constrict the sleeve portion.

4. A cable clamp comprising jaw members for engaging a cable, a retaining member for holding the jaw members in clamping engagement with the cable, and a constricting member having a sleeve portion for embracing the cable adjacent the jaw members and portions having anchoring engagement with the latter.

5. A cable clamp comprising jaw members for engaging a cable, a retaining member for holding the jaw members in clamping engagement with the cable, and a constricting member having sleeve portions for embracing the cable at opposite sides of the jaw members and connecting portions passing between the jaw members and connecting said sleeve portions.

In testimony whereof I have hereunto subscribed my name at Basel, Switzerland, on the 11th day of January, A. D. 1927.

ALFRED WICHERT.